US009674590B2

(12) United States Patent
Park et al.

(10) Patent No.: US 9,674,590 B2
(45) Date of Patent: Jun. 6, 2017

(54) SYSTEM AND METHOD FOR MANAGING SENSOR INFORMATION IN PORTABLE TERMINAL

(71) Applicant: Samsung Electronics Co., Ltd., Suwon-si, Gyeonggi-do (KR)

(72) Inventors: Jeongmin Park, Suwon-si (KR); Jaewoong Chun, Suwon-si (KR); Hwangjoon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 14/092,224

(22) Filed: Nov. 27, 2013

(65) Prior Publication Data

US 2014/0145860 A1 May 29, 2014

(30) Foreign Application Priority Data

Nov. 28, 2012 (KR) .................. 10-2012-0136056
Aug. 29, 2013 (KR) .................. 10-2013-0103461

(51) Int. Cl.
*H04Q 9/00* (2006.01)

(52) U.S. Cl.
CPC ..................... *H04Q 9/00* (2013.01)

(58) Field of Classification Search
CPC .... G06F 1/3203; G06F 1/3206; G06F 1/3287; G06F 1/3293; G06F 1/3234; G06F 1/3275; Y02B 60/121
See application file for complete search history.

(56) References Cited

U.S. PATENT DOCUMENTS

| | | | |
|---|---|---|---|
| 2004/0017300 A1 | 1/2004 | Kotzin et al. | |
| 2007/0094454 A1* | 4/2007 | Brundula | G06F 12/06 711/154 |
| 2010/0313050 A1* | 12/2010 | Harrat | G06F 1/3203 713/323 |
| 2012/0046767 A1* | 2/2012 | Shimohata | A63F 13/08 700/91 |
| 2012/0079300 A1* | 3/2012 | Hachisuga | H04N 5/23241 713/320 |
| 2013/0042129 A1* | 2/2013 | Park | G06F 1/3275 713/323 |
| 2013/0042132 A1* | 2/2013 | Park | G06F 1/3275 713/324 |
| 2013/0103900 A1* | 4/2013 | Chiu | G06F 11/004 711/112 |
| 2014/0013141 A1* | 1/2014 | Heo | G06F 1/3293 713/323 |

(Continued)

*Primary Examiner* — An T Nguyen
(74) *Attorney, Agent, or Firm* — Jefferson IP Law, LLP (57) ABSTRACT

A method and a system for managing sensor information in a portable terminal are provided. The method includes collecting the sensor information through a sensor unit by a sub-controller, determining whether a main controller is in a sleep state, determining whether the collected sensor information is able to be stored in a sub-memory when the main controller is in the sleep state, storing the collected sensing information in the sub-memory, and waking-up the main controller to move the collected sensor information and sensor information stored in the sub-memory to a main memory to store therein when the collected sensor information is unable to be stored in the sub-memory.

4 Claims, 6 Drawing Sheets

(56) References Cited

U.S. PATENT DOCUMENTS

| | | | |
|---|---|---|---|
| 2014/0059365 A1* | 2/2014 | Heo | G06F 1/3206 713/320 |
| 2014/0075226 A1* | 3/2014 | Heo | G06F 1/3234 713/323 |
| 2014/0145860 A1* | 5/2014 | Park | H04Q 9/00 340/870.16 |

* cited by examiner

SYSTEM AND METHOD FOR MANAGING SENSOR INFORMATION IN PORTABLE TERMINAL

CROSS-REFERENCE TO RELATED APPLICATION(S)

This application claims the benefit under 35 U.S.C. §119 (a) of a Korean patent application filed on Nov. 28, 2012 in the Korean Intellectual Property Office and assigned Serial No. 10-2012-0136056, and a Korean patent application filed on Aug. 29, 2013 in the Korean Intellectual Property Office and assigned Serial No. 10-2013-0103461, the entire disclosure of each of which is hereby incorporated by reference.

TECHNICAL FIELD

The present disclosure relates to a method and a system for managing sensor information in a portable terminal. More particularly, the present disclosure relates to a method of managing sensor information in a portable terminal capable of continuously collecting sensor information using a low power processor and utilizing the collected sensor information.

BACKGROUND

Due to the development of an information telecommunication technology and a semiconductor technology and the like, the diffusion and use of various electronic equipment has rapidly increased. The electronic equipment provides various functions such as a phone call, a music play, a text message transmission and reception, a digital broadcasting reception, a near field wireless communication, and an internet access.

Recently, a portable terminal includes a plurality of sensors. The portable terminal collects information on a surrounding environment using the various sensors, and analyzes collected information to provide an alarm with respect to the surrounding environment. To this end, the portable terminal drives a plurality of sensors. However, since the portable terminal is driven by a battery, a use time is inevitably limited. That is, since the portable terminal according to the related art uses the battery, the portable terminal cannot always drive the plurality of sensors. That is, the portable terminal according to the related art cannot continuously collect sensor information on a surrounding environment.

Accordingly, in recent years, there is a need for a method of minimizing current consumption of the portable terminal, continuously collecting surrounding environment information and user state information through a plurality of sensors, and using the collected information.

Meanwhile, there is growing interest in health care. Particularly, as a network connection such as a ubiquitous environment is possible regardless of time and location, there is growing interest in health care using a network without visiting a hospital. For example, there has been proposed a health management service where a separate sensor is attached to a body of the user, and a health state of the user is measured by the sensor. The measured result is transmitted to a hospital or a special service center so that the user may be diagnosed and prescribed. However, the user carries the sensor, a health state of the user is measured in a place equipped with a measuring device, and the measuring result must be transmitted to the hospital or the special service center. Accordingly, in recent years, there is growing interest in a health management service using a portable terminal carried by the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of managing sensor information in a portable terminal capable of minimizing current consumption in the portable terminal for driving a sensor to continuously collect and store sensor information in a sleep state, and a system thereof.

Another aspect of the present disclosure further provides a method of managing sensor information in a portable terminal capable of analyzing collected sensor information and providing an alarm according to the analysis result, and a system thereof.

Another aspect of the present disclosure further provides a method of managing sensor information in a portable terminal capable of providing an alarm with respect to a health state of a user based on collected sensor information.

Another aspect of the present disclosure further provides a method of managing sensor information in a portable terminal capable of moving the collected sensor information to a main memory to store therein, analyze and utilize when a sleep mode of a portable terminal is cancelled by an external event.

In accordance with an aspect of the present disclosure, a method of managing sensor information in a portable terminal including a sub-controller, a sensor unit controlled by the sub-controller, and a main controller driven, is provided. The method includes collecting the sensor information through the sensor unit by the sub-controller, determining whether the main controller is in a sleep state, determining whether the collected sensor information is able to be stored in a sub-memory when the main controller is in the sleep state, storing the collected sensing information in the sub-memory when the collected sensor information is able to be stored in the sub-memory, and waking-up the main controller to move the collected sensor information and sensor information stored in the sub-memory to a main memory to store therein when the collected sensor information is unable to be stored in the sub-memory.

In accordance with another aspect of the present disclosure, a method of managing sensor information in a portable terminal including a sub-controller driven with lower power than a main controller, a sub-memory, a sensor unit controlled by the sub-controller, and the main controller driven with higher power than the sub-controller, is provided. The method includes collecting the sensor information through the sensor unit by the sub-controller in a sleep sate of the main controller, checking a storage space of the sub-memory to determine whether the collected sensor information is able to be stored, and deleting some sensor information from among sensor information which are previously stored in the sub-memory when the collected sensor information is not able to be stored, and storing the collected sensor information.

In accordance with another aspect of the present disclosure, a portable terminal is provided. The terminal includes a sensor unit including at least one sensor, a sub-controller controlling driving of the sensor unit, a sub-memory controlled by the sub-controller, a main controller, and a main memory controlled by the main controller, wherein the sub-controller collects the sensor information through the sensor unit, determines whether the main controller is in a sleep state, determines whether the collected sensor information is able to be stored in a sub-memory when the main controller is in the sleep state, stores the collected sensor information in the sub-memory when the collected sensor information is able to be stored in the sub-memory, and wakes-up the main controller when the collected sensor information is not able to be stored in the sub-memory, and the main controller woken-up by the sub-controller moves the collected sensor information and sensor information stored in the sub-memory to the main memory to store therein.

In accordance with another aspect of the present disclosure, a portable terminal is provided. The portable terminal includes a sensor unit including at least one sensor, a sub-controller configured to control driving of the sensor unit, and to be driven with lower power than a main controller, a sub-memory controlled by the sub-controller, and the main controller configured to be driven with higher power than the sub-controller. The sub-controller collects sensor information through the sensor unit when the main controller is in a sleep state, checks a storage space of the sub-memory to determine whether the collected sensor information is able to be stored, deletes some sensor information from among sensor information which are previously stored in the sub-memory when the collected sensor information is not able to be stored, and stores the collected sensor information in the sub-memory.

In accordance with still another aspect of the present disclosure, a system for managing sensor information is provided. The system includes a portable terminal collecting and storing sensor information through a sensor unit controlled by a sub-controller, transmitting the stored sensor information to a preset server periodically, analyzing the stored sensor information, and providing an alarm when the analyzed sensor information satisfies a preset first or second alarm condition, and a server receiving and storing the sensor information from the portable terminal, analyzing the received and stored information, determining whether the analyzed information satisfies a preset third alarm condition, and transmitting an alarm message to the portable terminal when the analyzed information satisfies the preset third alarm condition.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to the description, the portable terminal according to the present disclosure may be a mobile communication terminal, a smart phone, a tablet Personal Computer (PC), a hand-held PC, a Portable Multimedia Player (PMP), or a Personal Digital Assistant (PDA). The following embodiment will be described on the assumption that the portable terminal is a mobile communication terminal.

The present disclosure includes a separate low power processor for controlling a sensor to collect sensor information, and continuously collects and stores sensor information in a sleep state of the portable terminal. Further, the present disclosure may provide an alarm with respect to a surrounding environment using continuously collected sensor information. In addition, the present disclosure may predict an error of a sensing value through a variation of the sensor information which is continuously collected.

Figure 1:
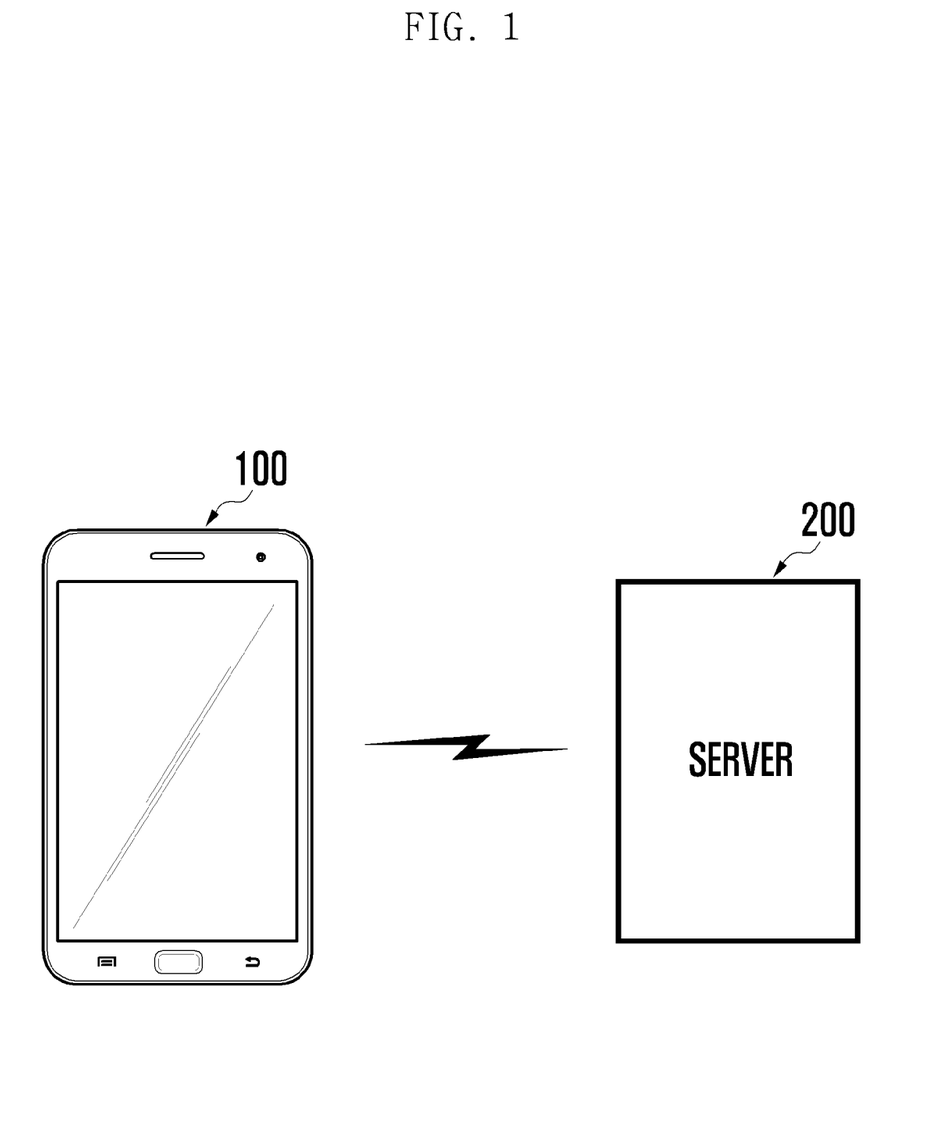
FIG. 1 is a diagram illustrating a system for managing sensor information according to an embodiment of the present disclosure.

FIG. 1 is a diagram illustrating a system for managing sensor information according to an embodiment of the present disclosure.

Referring to FIG. 1, the system for managing sensor information may include a portable terminal 100 and a server 200. The portable terminal 100 may continuously collect sensor information through a sensor unit (not shown) including at least one sensor, and use collected sensor information. For example, the portable terminal 100 may continuously collect at least one (hereinafter referred to as 'sensor information') of surrounding environment information and user state information through a plurality of sensors. Next, the portable terminal 100 analyzes the collected sensor information. When the analyzed sensor information satisfies a preset alarm condition, the portable terminal 100 may provide an alarm with respect to a surrounding environment (e.g., alarm with respect to dangerous situation for health). In this case, the portable terminal 100 may analyze collected sensor information during a predetermined period to provide the alarm.

In addition, the portable terminal 100 calculates a correction value of a sensor through the collected sensor information, and may provide an accurate sensing value by correcting the sensing value by using the calculated correction value.

The portable terminal 100 according to the present disclosure may further include a low power processor (e.g., Micro Controller Unit (MCU), Micro Processor Unit (MPU)) for collecting the sensor information as well as a main processor (e.g., Central Processing Unit (CPU), Application Processor (AP), and the like) for controlling an overall operation of the portable terminal 100. The portable terminal 100 includes the low power processor for the purpose of continuously collecting the sensor information by minimizing current consumption. That is, the portable terminal 100 according to the present disclosure may maintain a main processor (hereinafter referred to as 'main controller') having large current consumption in a wake-up state, and may continuously collect sensor information through a low power processor (hereinafter referred to 'sub-controller') having relatively small current consumption.

Further, when the portable terminal 100 is in a sleep state, the portable terminal 100 stores the collected sensor information in an internal memory (hereinafter referred to as 'sub-memory') included in the sub-controller. When the portable terminal 100 is in the wake-up state, the portable terminal 100 may store the collected sensor information in the main memory. Meanwhile, when a storage space of the sub-memory is insufficient in the sleep state, the sub-controller wakes-up the main controller, and moves the sensor information stored in the sub-memory to the main memory so that the main memory may store the sensor information.

Alternatively, when the storage space of the sub-memory is insufficient, the portable terminal 100 deletes the oldest stored sensor information from among the sensor information stored in the sub-memory, and may store the collected sensor information.

The portable terminal 100 analyzes the collected sensor information. When the collected sensor information satisfies a preset alarm condition, the portable terminal 100 may provide an alarm. For example, the alarm condition may be a reference condition for determining whether a health state of the user becomes worse, a current environment is an environment in which the user may be dangerous or an influence adversely affecting a health of the user. The alarm condition may include surrounding environment information such as a temperature, moisture, atmospheric pressure, UltraViolet (UV) ray, radioactivity, carbon dioxide, environment harmful material, and the like or user state information such as motion, body temperature, electrocardiography, blood pressure, and blood glucose, and the like. For example, the alarm condition may include a hypothermia induction environment where a temperature less than a predetermined temperature (e.g., 0° C.) is maintained for a predetermined time (e.g., 1 hour) or more, a season change cold induction environment where a difference between the highest temperature and the lowest temperature for one day is greater than a predetermined value, an air-conditioningitis induction environment where a temperature difference from an external temperature greater than a predetermined value (e.g., 8° C.) is maintained for a predetermined time (e.g., 2 hours) or more, an average motion amount per day/week/month/year, an exposed amount of ultraviolet rays per minute/hour. The alarm condition may be classified into a first alarm condition and a second alarm condition.

The first alarm condition is stored in the sub-memory, and is used for reporting the alarm by the sub-controller. The first alarm condition is a reference condition with respect to sensing information collected during a relatively short period (e.g., several minutes to several hours). This is because of a limitation on the performance of the sub-controller driven with low power. For example, the first alarm condition may include the hypothermia induction environment, the air-conditioningitis induction environment, and the exposed amount of ultraviolet rays.

The second alarm condition is stored in the main memory, and is used for reporting the alarm by the main-controller. The second alarm condition is a reference condition with respect to sensing information collected during a relatively long period (e.g., day to month). For example, the second alarm condition may include an average motion amount per day/week/month/year.

The portable terminal 100 may provide a warning message output reporting a health risk of the user and an alarm through a warning sound output. The portable terminal 100 may transmit an emergency call or emergency message to a preset contact point (emergency rescue party, family doctor, and a friend) to provide an alarm.

The portable terminal 100 may correct a measurement error of sensor based on the collected sensor information. For example, the portable terminal 100 checks the variation of sensor value based on the collected sensor information, calculates a compensation value through the variation of sensor value, and may correct the measurement error of the sensor by using the calculated compensation value.

In addition, the portable terminal 100 may control peripheral devices (e.g., air-conditioner, heater, humidifier, boiler, etc.) which are connected in a wireless scheme (e.g., home network). For example, when an internal temperature is maintained at 26° C. or less for 1 hour or more in the summer, the portable terminal 100 may control an air-conditioner to increase the internal temperature. When the internal temperature is maintained at 30° C. or more for 1 hour or more, the portable terminal 100 may control the air-conditioner to reduce the internal temperature in the summer. When the internal temperature is maintained at 18° C. or less for 1 hour or more in the winter, the portable terminal 100 may control a temperature of the heater or the boiler to increase the internal temperature. When the internal temperature is maintained at 23° C. or more for 1 hour or more in the winter, the portable terminal 100 may control the temperature of the heater or the boiler to reduce the internal temperature. In the same manner, the portable terminal 100 may control the humidifier to suitably maintain humidity.

The portable terminal 100 may transmit the collected sensor information to the preset server 200, and receive an alarm message from the server 200. The portable terminal 100 may receive an optimized alarm condition according to a health state of the user from the server 200 to update the stored alarm condition.

The server 200 receives, stores, and analyzes sensor information, and provides an analysis result to the portable terminal 100. In detail, the server 200 receives and stores the sensor information from the portable terminal 100 periodically. The server 200 analyzes the stored sensor information. When the analyzed stored sensor information satisfies the preset third alarm condition, the server 200 may generate an alarm message and transmits the alarm message to the portable terminal 100. For example, when the present disclosure is used for managing the health of the user, the server 200 may include a server of the hospital designated by the user and a health management center, and the like operated by a national institute. The alarm message may include medicine information, emergency treatment method, location of adjacent hospital or pharmacy, recommended training, recommended food, and warning message, and the like.

Further, the server 200 may store a database of collected sensor information corresponding to users, and generate and provide an alarm condition (including first and second alarm conditions) optimized in a health state of the user based on the database corresponding to users to the portable terminal 100. Meanwhile, in a case of a patient requiring a continuous management, a family doctor checks stored sensor information of the patient. When countermeasures are needed, the family doctor may transmit an alarm message.

Figure 2:
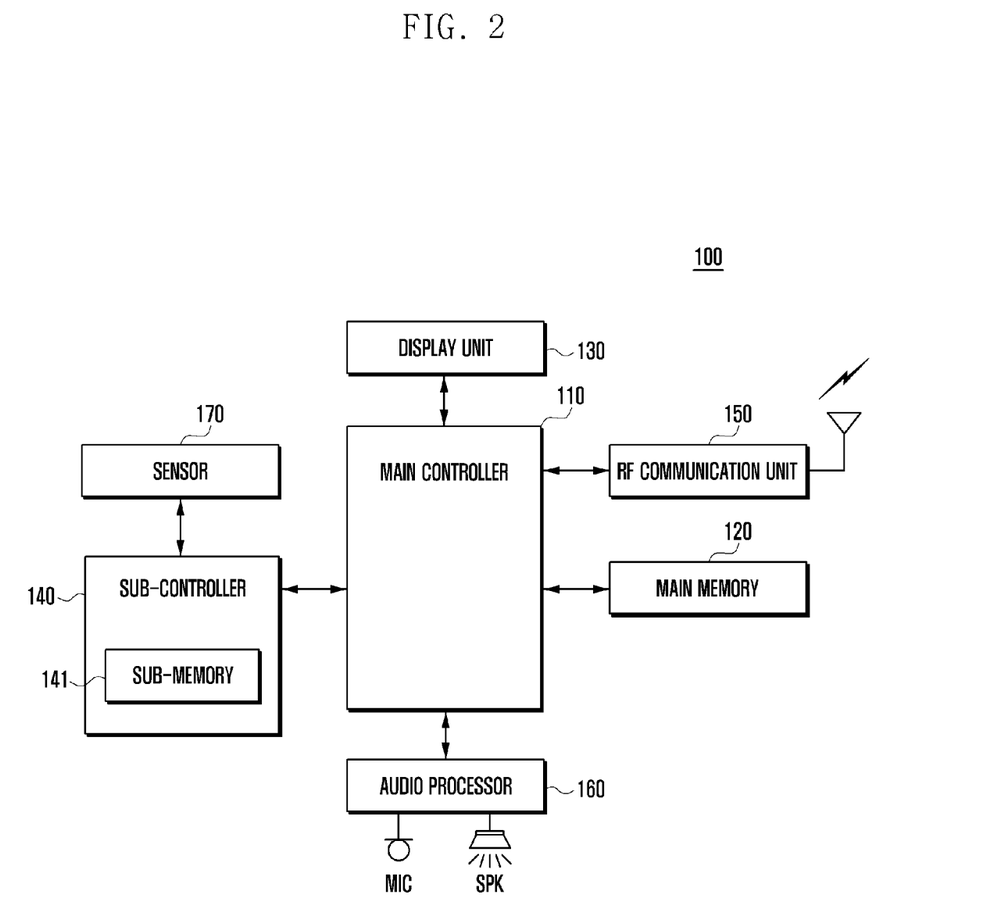
FIG. 2 is a block diagram schematically illustrating a configuration of a portable terminal according to an embodiment of the present disclosure.

FIG. 2 is a block diagram schematically illustrating a configuration of a portable terminal according to an embodiment of the present disclosure.

Referring to FIG. 2, the portable terminal 100 according to the embodiment of the present disclosure may include a main controller 110, a sub-controller 140, a display unit 130, a main memory 120, a Radio Frequency (RF) communication unit 150, an audio processor 160, and a sensor 170. The sub-controller 140 may include a sub-memory 141.

The RF communication unit 150 supports a wireless communication function of the portable terminal 100. When the portable terminal 100 supports the mobile communication function, the portable terminal 100 may include a mobile communication module. Particularly, the RF communication unit 150 according to the present disclosure may transmit the collected sensor information to the server 200. Further, the RF communication unit 150 may receive an alarm message reporting a danger risk of the user from the server 200. The alarm message may include medicine information, an emergency treatment method, a recommended exercise, a recommended food, a warning message, and the like. When the user is in an emergency situation, the RF communication unit 150 may transmit an emergency call request or an emergency message to a preset contact point (e.g., emergency rescue party, police station, hospital, family doctor, and a friend) under the control of the main controller 110. In this case, the RF communication unit 150 may transmit location information of the user. The RF communication unit 150 may receive the alarm condition (including at least one of the first and second alarm conditions) from the server 200.

Meanwhile, the RF communication unit 150 may form a communication channel with a peripheral device (e.g., air-conditioner, heater, boiler, humidifier, and the like). For example, the portable terminal 100 may form a home network with the peripheral device through the RF communication unit. The RF communication unit 150 may transmit a control command for controlling a surrounding environment to the peripheral device not to affect the health of the user.

The display unit 130 displays information input by the user and information provided to the user as well as various menus of the portable terminal 100. That is, the display unit 130 may provide various screen according to use of the portable terminal 100, for example, a home screen, a menu screen, a message creation screen, a call screen, and a schedule management screen, and an address book view, and a web page output view. When entering a sleep mode, the display unit 130 is turned-OFF. When the sleep mode is released, the display unit 130 is turned-ON. In particular, the display unit 130 according to the present disclosure may display a warning message reporting a health risk of the user and an alarm message received from the server 200 under the control of the main controller 110. The display unit 130 may be configured by a Liquid Crystal Display (LCD) or an Organic Light Emitted Diode (OLED). Meanwhile, when the display unit 130 is configured in the form of a touch screen, the display unit 130 may perform a function of an input unit (not shown).

The audio processor 160 may include a speaker SPK for outputting audio data transmitted/received during a call, audio data included in a received message, and audio data according to playback of an audio file stored in the main memory 120 and a microphone MIC for collecting a voice of the user or other audio signals. Particularly, the audio processor 160 according to the present disclosure may output a warning sound reporting health risk of the user through the speaker SPK under the control of the main controller 110.

The sensor 170 is controlled under the control of the sub-controller 140, and may collect peripheral situation and state (e.g., motion) information of the portable terminal 100. To this end, the sensor 170 may include an acceleration sensor, a motion sensor, a geomagnetic sensor, a temperature sensor, a humidity sensor, an atmospheric pressure sensor, a pressure sensor, a gravity sensor, an UV sensor, a proximity sensor, an environment sensor, a bio information sensor, and any other similar and/or suitable sensor. The sensor 170 may transmit a sensor value corresponding to a peripheral situation and state of the portable terminal 100 in a sleep mode and an activation mode. That is, even if the portable terminal 100 enters the sleep mode, the sensor 170 is driven by the sub-controller 140 having low power, and may collect peripheral situation and state information.

In the meantime, although FIG. 2 illustrates that the sensor 170 is connected to the sub-controller 140, the present disclosure is not limited thereto. That is, in the portable terminal 100 according to another embodiment of the present disclosure, the sensor 170 may be connected to the sub-controller 140 in the sleep mode. The sensor 170 may be connected to the main controller 110 in the activation mode. In this case, the portable terminal 100 further include a switch unit (not shown) performs switching so that the sensor unit 170 is connected to the sub-controller 140 in the sleep mode, and the sensor unit 170 is connected to the main controller 110 in the activation mode.

The sub-controller 140 may control driving of the sensor unit 170. The sub-controller 140 may be configured with a Micro-Processor Unit (MPU) or a Micro Control Unit (MCU) which is a low power processor. For example, the sub-controller 140 may collect a temperature, moisture, ultraviolet rays, motion, atmospheric pressure, body temperature, electrocardiography, blood pressure, radioactivity, and an environment material.

The sub-controller 140 may include a sub-memory 141 for storing the collected sensor information. As the collected information is stored in the sub-memory 141, the sub-controller 140 may maintain a sleep state of the main controller 110 having large current consumption. Meanwhile, when the storage space of the sub-memory 141 is insufficient, the sub-controller 140 may transmit a wake-up signal to the main controller 110. That is, when the storage space of the sub-memory 141 is insufficient, the sub-controller 140 may wake-up the main controller 110 to move the sensor information stored in the sub-memory 141 to the main memory 120.

Additionally, when the storage space of the sub-memory 141 is insufficient, the sub-controller 140 may delete the oldest sensor information from among the sensor information stored in the sub-memory 141 to secure the storage space, and may store the collected sensor information into the secured storage space of the sub-memory 141. In this case, when the main controller 110 is woken-up due to an external event (e.g., call reception, text message reception, physical key input, and the like), the sub-controller 140 may move the sensor information stored in the sub-memory 141 to the main memory 120 to store therein.

Further, the sub-controller 140 may analyze the collected sensor information to determine whether the collected sensor information satisfies the first alarm condition stored in the sub-memory 141. When the analyzed result of the collected sensor information satisfies the first alarm condition, the sub-controller 140 may transmit an alarm request signal to the main controller 110. In this case, when the main controller 110 is in the sleep state, the sub-controller 140 may transmit a wake-up signal to the main controller 110 and then transmit the alarm request signal.

Meanwhile, although FIG. 2 illustrates that the sub-memory 141 is included in the sub-controller 140, the present disclosure is not limited thereto. That is, the sub-memory 141 may be included as a separate configuration. In this case, additionally or alternatively, the separate sub-memory 141 is driven with low power.

The main memory 120 may store an Operating System (OS) of the portable terminal 100, an application program used for other options functions, for example, voice playback function, an image or moving image playback function, a broadcasting playback function, and user data and data transmitted/received during communication. For example, the main memory 120 may store a moving image file, a game file, a music file, and a movie file. Particularly, the main memory 120 according to the present disclosure may store sensor information collected through the sensor unit 170. The main memory 120 may receive and store the sensor information stored in the sub-memory 141. Further, the main memory 120 may store the second alarm condition. Since the second alarm condition was described above, a detailed description thereof is omitted.

The main controller 110 may control an overall operation of the portable terminal 100 and signal flow between internal blocks of the portable terminal 100, and may perform a data processing function processing data. For example, the main controller 110 may include a Central Processing Unit (CPU) and an Application Processor having large current consumption. Particularly, the main controller 110 according to the present disclosure enters a sleep mode when appropriate in order to reduce current consumption. Upon receiving a wake-up signal from the sub-controller 140 in the sleep mode, the main controller 110 may be activated. For example, when sensor information collected through the sensor unit 170 cannot be stored because the sub-memory 141 has an insufficient storage space, the main controller 110 may be woken-up under the control of the sub-controller 140. The woken-up main controller 110 may move the sensor information stored in the sub-memory 141 to the main memory 120. In addition, when the main controller 110 is woken-up by an external event, the main controller 110 may control the sub-controller 140 so that the sensor information stored in the sub-memory 141 moves to the main memory 120.

Further, when receiving the alarm request signal from the sub-controller 140, the main controller 110 may be woken-up. When the analysis result of the collected sensor information satisfies the first alarm condition, the alarm request signal is generated by the sub-controller 140. When receiving the alarm message reporting the danger of the user's health from the server 200 through the RF communication unit 150, the main controller 110 may be woken-up.

Meanwhile, the main controller 110 may periodically analyze sensor information stored in the main memory 120. In this case, the main controller 110 may analyze sensor information received during a predetermined period according to the alarm condition. For example, when analyzing exposure to ultraviolet rays, the controller 110 analyzes sensor information (e.g., information collected by the ultraviolet sensor) collected for 1 to 2 hours. When analyzing an amount of physical activity per week, the main controller 110 may analyze sensor information (e.g., sensor information collected through a geomagnetic sensor, acceleration sensor, a gravity sensor) collected for one week. When the analysis result of the sensor information satisfies the second alarm condition, the main controller 110 may report an alarm.

When receiving the alarm request signal or the alarm message or when the analysis result of the sensor information satisfies the second alarm condition, the main controller 110 may report the alarm. In detail, the main controller 110 may display a warning message reporting a health risk to the user on the display unit 130, output a warning sound through a speaker SPK of the audio processor 160, generate a vibration through a vibration motor (not shown) to report the alarm. The main controller 110 may transmit an emergency call or emergency message to a preset contact point (e.g., emergency rescue party, police station, designated hospital, family doctor, and a friend). In this case, the controller 110 checks current location information through triangulation through a Global Positioning System (GPS) receiver (not shown) and a base station, and may transmit the checked current location information. The location measuring method is generally known in the art and a detailed description thereof is omitted.

Further, the main controller 110 may control peripheral devices (e.g., air-conditioner, heater, humidifier, and boiler) which are connected in a wireless scheme (e.g., home network) to release the alarm. The main controller 110 may control the peripheral device to maintain an environment suitable for health. For example, when an internal temperature is maintained at 26° C. or less for 1 hour or more in the summer, the controller 110 may control an air-conditioner to increase the internal temperature.

When the internal temperature of the portable terminal 100 is maintained at 30° C. or more for 1 hour or more, the portable terminal 100 may control the air-conditioner to reduce the internal temperature in the summer. When the internal temperature of the portable terminal 100 is maintained at 18° C. or more for 1 hour or longer in the winter, the portable terminal 100 may control a temperature of the heater or the boiler to increase the internal temperature.

When the internal temperature of the portable terminal 100 is maintained at 23° C. or more for 1 hour or more in the winter, the portable terminal 100 may control the temperature of the heater or the boiler to reduce the internal temperature. In the same manner, the main controller 110 may control the humidifier to suitably maintain humidity.

Meanwhile, although not shown in FIG. 2, the portable terminal 100 may selectively further include constituent elements having an additional function such as a GPS module for receiving location information, a broadcasting receiving module for receiving broadcasting, a digital sound source playback module, and an Internet communication module performing an Internet function. Since the structural elements can be variously changed according to convergence trend of a digital device, no additional elements are listed herein. However, the portable terminal 100 may further include structural elements equivalent to the foregoing constituent elements.

Figure 3A:
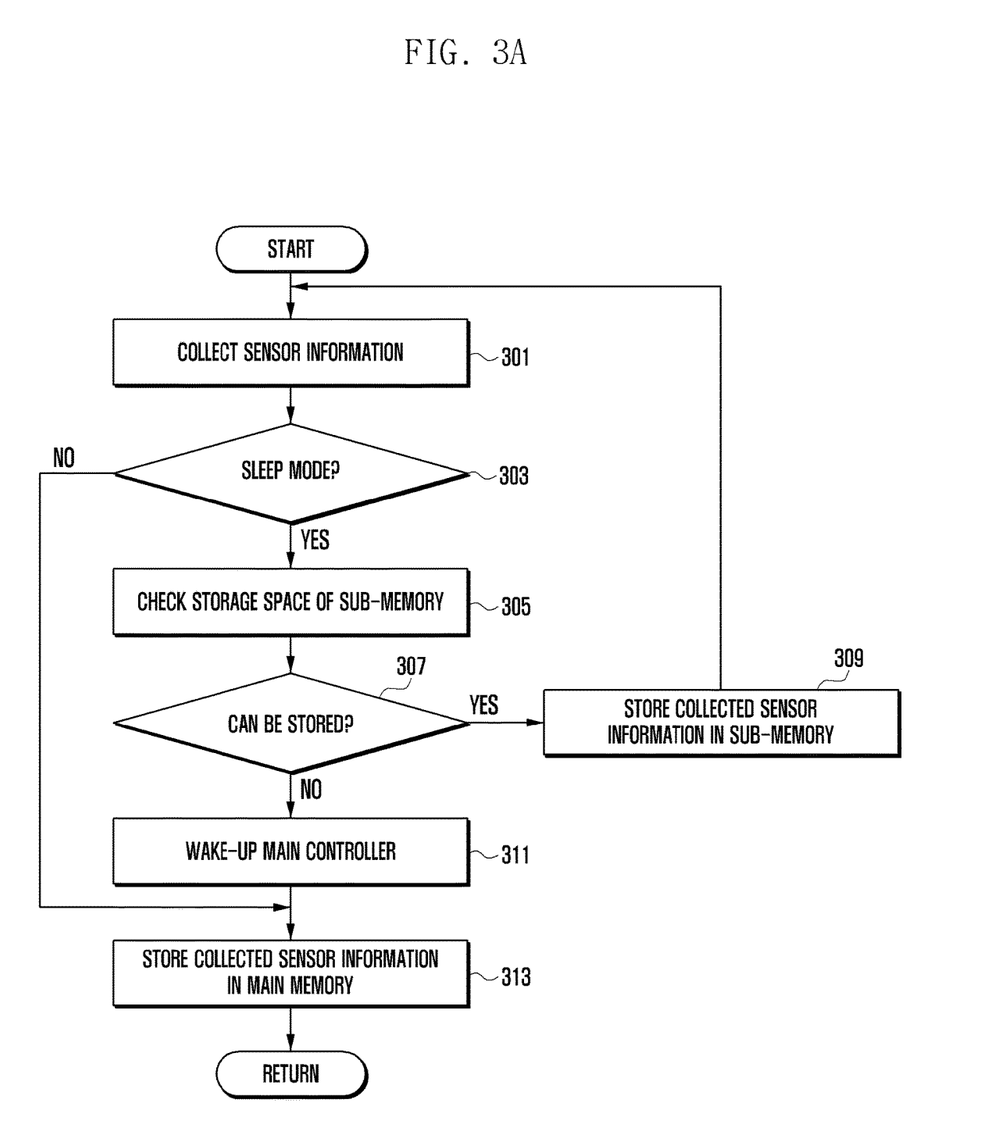
FIG. 3A is a flowchart illustrating a method of collecting sensor information in a portable terminal according to an embodiment of the present disclosure.

FIG. 3A is a flowchart illustrating a method of collecting sensor information in a portable terminal according to an embodiment of the present disclosure.

Referring to FIGS. 1 to 3A, a sub-controller 140 of the portable terminal 100 according to an embodiment of the present disclosure may collect sensor information at operation 301. The sensor information is collected through the sensor unit 170 connected to the sub-controller 140. As described above, the sensor unit 170 may include a plurality of sensors for recognizing surrounding environment information and state information of the user. The plurality of sensors may periodically be operated in consideration of current consumption. In this case, the operation period of each sensor may be differently set. For example, the UV sensor may have an operation period for several seconds to several minutes, the temperature sensor and the humidity sensor may have an operation period for several minutes to several tens of minutes.

The sub-controller 140 may determine whether the main controller 110 is in a sleep mode at operation 303. When the main controller 110 is not in the sleep mode, the sub-controller 140 proceeds to operation 313. When the main controller 110 is in the sleep mode, the sub-controller 140 checks a storage space of the sub-memory 141 at operation 305, and determines whether the collected sensor information may be stored in the sub-memory 141 at operation 307. When the collected sensor information may be stored in the sub-memory 141, the sub-controller 140 stores the collected sensor information in the sub-memory 141 at operation 309 and may return to operation 301. On the other hand, when the collected sensor information may not be stored in the sub-memory 141, the sub-controller 140 may wake-up the main controller 110 at operation 311.

The woken-up main controller 110 may store the collected sensor information in the main memory 120 at operation 313. In this case, the sub-controller 140 may move the sensor information stored in the sub-memory 141 to the main memory 120.

If the motion of the sensor information is terminated, the sub-controller 140 may return to operation 301 and repeat the foregoing procedure. In this case, the main controller 110 enters in a sleep state.

Meanwhile, in the FIG. 3A, it was illustrated that the sub-controller 140 collects the sensor information regardless of a sleep mode. However, the present disclosure is not limited thereto. For example, when the sensor unit 170 can be switched between the main controller 110 and the sub-controller 140 through a switch (not shown), the main controller 110 may collect the sensor information in an activation mode, and the sub-controller 140 may collect the sensor information in a sleep mode.

In this manner, since the present disclosure maintains a main controller 110 having large current consumption in a sleep state and collects sensor information through a sub-controller 140 having small current consumption, the current consumption of the portable terminal 100 may be minimized. Accordingly, the present embodiment may continuously collect sensor information for a long time. In the related art, current consumption is increased so that the sensor information may not be continuously collected.

Figure 3B:
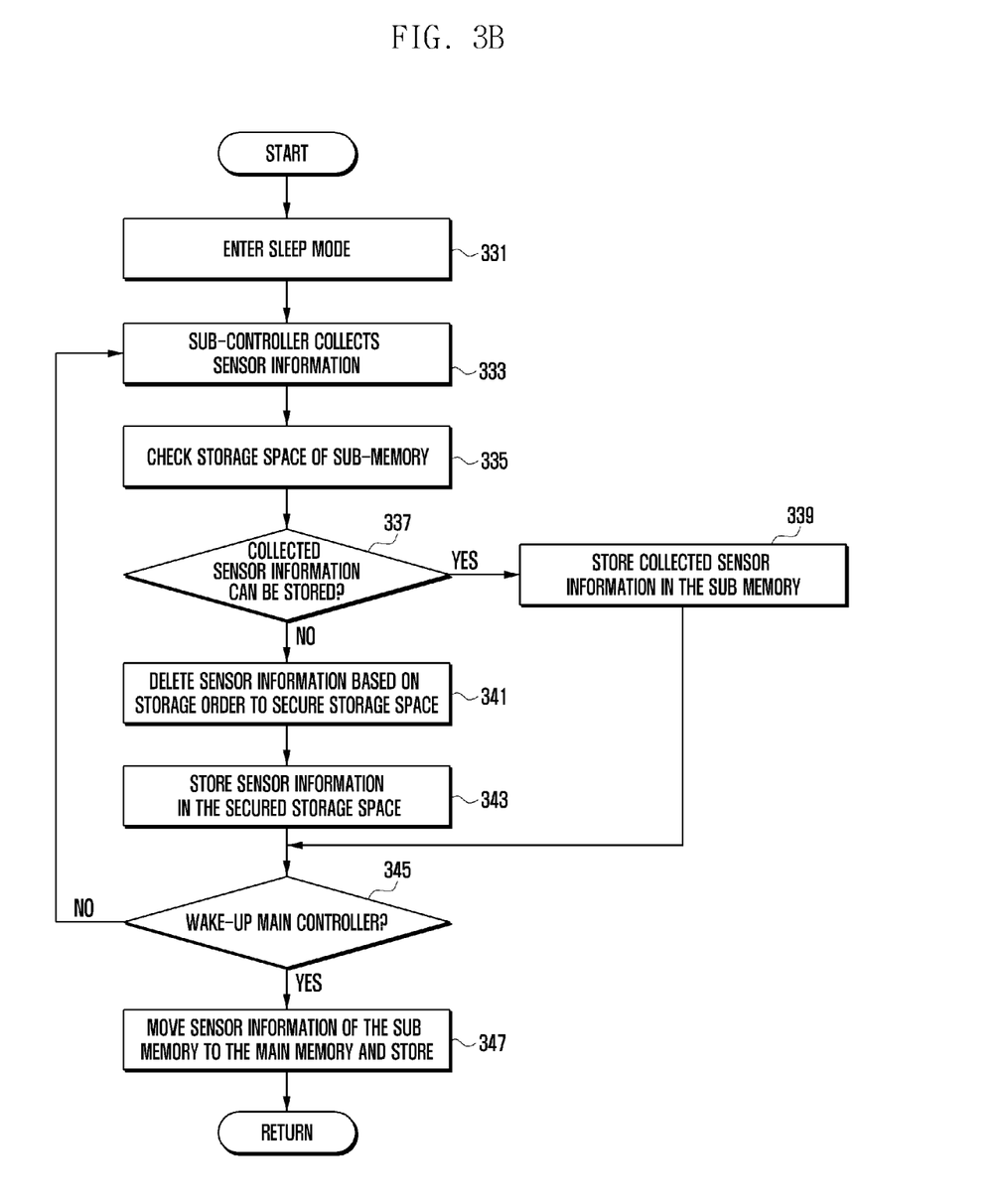
FIG. 3B is a flowchart illustrating a method of collecting sensor information in a portable terminal according to another embodiment of the present disclosure.

FIG. 3B is a flowchart illustrating a method of collecting sensor information in a portable terminal according to another embodiment of the present disclosure.

Referring to FIG. 1, FIG. 2, FIG. 3A, and FIG. 3B, the portable terminal 100 according to another embodiment of the present disclosure may enter a sleep mode at operation 331. The sleep mode can be entered when there is no input for a certain time (e.g., 30 seconds), or upon a user request to enter the sleep mode.

When the portable terminal 100 enters the sleep mode, the sub-controller 140 may collect sensor information at operation 333. The sensor information is collected through the sensor unit 170 connected to the sub-controller 140. As described above, the sensor unit 170 may include a plurality of sensors for recognizing surrounding environment information and state information of the user. The plurality of sensors may operate periodically in consideration of current consumption. At this time, the operation period of each sensor may be differently set. For example, a UV sensor may have an operation period for several seconds to several minutes, the temperature sensor and the humidity sensor may have an operation period for several minutes to several tens of minutes.

The sub-controller 140 checks a storage space of the sub-memory 141 at operation 335, and may determine whether the collected sensor information can be stored in the sub-memory 141 at operation 337. When the sensor information collected at operation 337 can be stored in the sub-memory 141, the sub-controller 140 stores the collected sensor information in the sub-memory 141 at operation 339 and may proceed to operation 345, which is described further below.

On the other hand, when the sensor information collected at operation 337 cannot be stored in the sub-memory 141, for example, when the storage space of the sub-memory 141 is insufficient, the sub-controller 140 may delete at least a part of sensor information from among the sensor information stored in the sub-memory 141 to secure the storage space at operation 341. For example, the sub-controller 140 may delete one sensor information which is the oldest, and then again check the storage space. That is, the sub-controller 140 may delete the oldest stored sensor information one by one until the storage space where the collected sensor information is to be stored is secured.

Alternatively, the sub-controller 140 may delete the sensor information stored in the sub-memory 141 on the basis of a preset size (e.g., 5 MB). For example, the sub-controller 140 may delete a plurality of old stored sensor information so that the storage space is secured with 5 MB or more.

Alternatively, the sub-controller 140 may delete the sensor information stored in the sub-memory 141 on the basis of a certain time. For example, the sub-controller 140 may delete sensor information having a time difference of two minutes on the basis of the oldest sensor information.

Alternatively, the sub-controller 140 checks the size of the collected sensor information, and may delete the oldest sensor information so that the storage space is secured by as much as the amount of collected sensor information.

The sub-controller 140 may store the collected sensor information into the secured storage space at operation 343. The sub-controller 140 may check whether the main controller 110 is woken-up at operation 345. The main controller 110 may be woken-up by an external event such as a call reception, a text message reception, an alarm, a physical key input, and the like.

When the main controller 110 is not woken-up at operation 345, the sub-controller 140 may return to operation 333 to repeat the above described procedure. On the other hand, when the main controller 110 is woken-up at operation 345, the sub-controller 140 moves the sensor information stored in the sub-memory 141 to the main memory 120 to store therein.

The other embodiment of the present disclosure may decrease the time during when the main controller 110 is unnecessarily woken-up. For example, the main controller 110 is not woken-up although the storage space of the sub-memory 141 is insufficient, and the main controller 110 may stand by until the main controller 110 is woken-up by the external event. Like this, the other embodiment of the present disclosure can further reduce current consumption by preventing the unnecessary wake-up of the main controller 110. The other embodiment of the present disclosure may be useful when sensor information which is elapsed over a certain time is meaningless. For example, when it is assumed that a compensation value is calculated by using only sensor information for a certain time (e.g., 15 minutes), the other embodiment of the present disclosure is useful rather than one embodiment of the present disclosure, wherein the one embodiment of the present disclosure moves sensor information to the main memory 120 to store therein, and the other embodiment of the present disclosure deletes old sensor information to store new sensor information.

Figure 4:
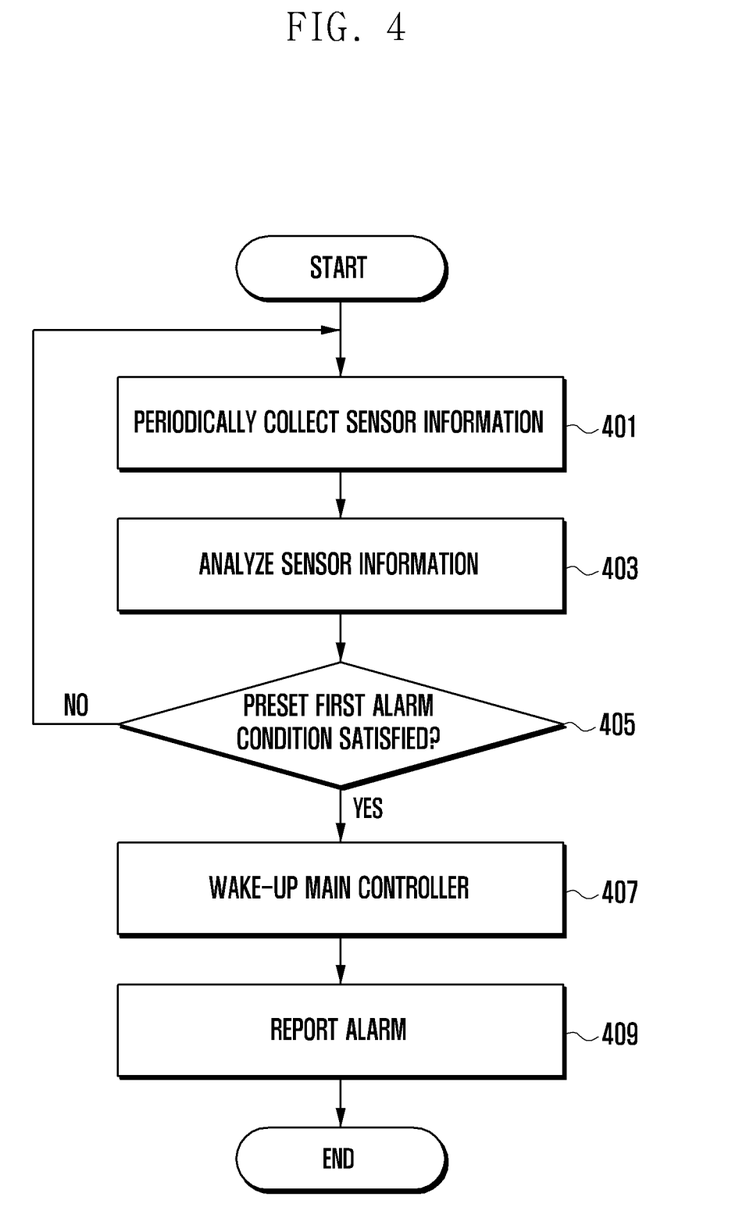
FIG. 4 is a flowchart illustrating an alarm reporting method in a portable terminal according to an embodiment of the present disclosure.

FIG. 4 is a flowchart illustrating an alarm reporting method in a portable terminal according to an embodiment of the present disclosure. The following embodiment will be described on the assumption that the portable terminal is in a sleep state.

Referring to FIGS. 1 to 4, a sub-controller 140 according to the embodiment of the present disclosure may periodically collect sensor information at operation 401. Since an operation of collecting the sensor information was given in FIGS. 3A and 3B, a detailed description thereof is omitted.

The sub-controller 140 may analyze the sensor information at operation 403, and may determine whether the analyzed sensor information satisfies a preset first alarm condition at operation 405. If the analysis result of the sensor information does not satisfy the first alarm condition, the sub-controller 140 may return to operation 401 and repeat the forgoing procedures. If the analysis result of the sensor information satisfies the first alarm condition, the sub-controller 140 may wake-up the main controller 110 at operation 407.

The woken-up main controller 110 may report an alarm at operation 409. The alarm reporting may be an output of a warning message and/or a warning sound reporting dangerous situation such as exposure to ultraviolet rays, hypothermia, and air-conditioningitis. The alarm reporting may be an emergency call or an emergency message transmission request to a preset contact point (e.g., emergency rescue party, hospital, family doctor, and a friend).

In addition, the main controller 110 may control peripheral devices (e.g., air-conditioner, heater, humidifier, boiler, etc.) which are connected in a wireless scheme (e.g., home network). For example, when an internal temperature is maintained at 26° C. or less for 1 hour or more in the summer, the portable terminal 100 may control an air-conditioner to increase the internal temperature. When the internal temperature is maintained at 30° C. or more for 1 hour or more, the portable terminal 100 may control the air-conditioner to reduce the internal temperature in the summer. When the internal temperature is maintained at 18° C. or less for 1 hour or more in the winter, the portable terminal 100 may control a temperature of the heater or the boiler to increase the internal temperature. When the internal temperature is maintained at 23° C. or more for 1 hour or more in the winter, the portable terminal 100 may control the temperature of the heater or the boiler to reduce the internal temperature. In the same manner, the portable terminal 100 may control the humidifier to suitably maintain humidity.

Further, the foregoing embodiment has illustrated that the sub-controller 140 analyzes collected sensor information in a sleep state, and compares the analyzed collected sensor information with the first alarm condition to report the alarm. However, the present disclosure is not limited thereto. That is, the performance of the sub-controller 140 is restrictive due to a design of low power. Further, the information amount of a sensor stored in the sub-memory 141 may be restrictive. Accordingly, when a complicated calculation is required, for example, the sensor information of a long time (e.g., one day, one week) is analyzed, the main controller 110 may analyze sensor information stored in the main memory 120 periodically, compare the analysis result with the second alarm condition, and report the alarm when the analysis result satisfies the second alarm condition. In this case, if the main controller 110 is in the sleep state at the time point when analysis of the sensor information in which a complex calculation is required, the main controller 110 may be woken-up. When the sensor information of very long time (e.g., one month, one year) is analyzed or a very complex calculation is required, the analysis of the sensor information and the alarm may be performed by the server 200. That is, the server 200 analyzes sensor information received and stored from the portable terminal 100 periodically, compares the analysis result with the third alarm condition, and generates an alarm message when the analysis result satisfies the third alarm condition, and transmits the generated alarm message to the portable terminal 100.

In the meantime, FIG. 4 illustrated that the collected sensor information is used to notify the alarm. However, in the other embodiment of the present disclosure, the collected sensor information can be used to correct the measurement value of sensor. For example, when the portable terminal 100 has a function of measuring the external temperature and/or humidity, if the portable terminal 100 is used for a long time, heat is generated. Accordingly, the portable terminal 100 cannot measure the correct external temperature and/or humidity. Thus, the other embodiment of the present disclosure can calculate the compensation value through the collected sensor information (e.g., temperature and/or humidity), and properly compensate the value measured through a temperature and humidity sensor with the calculated compensation value such that an accurate measurement result can be provided.

Figure 5:
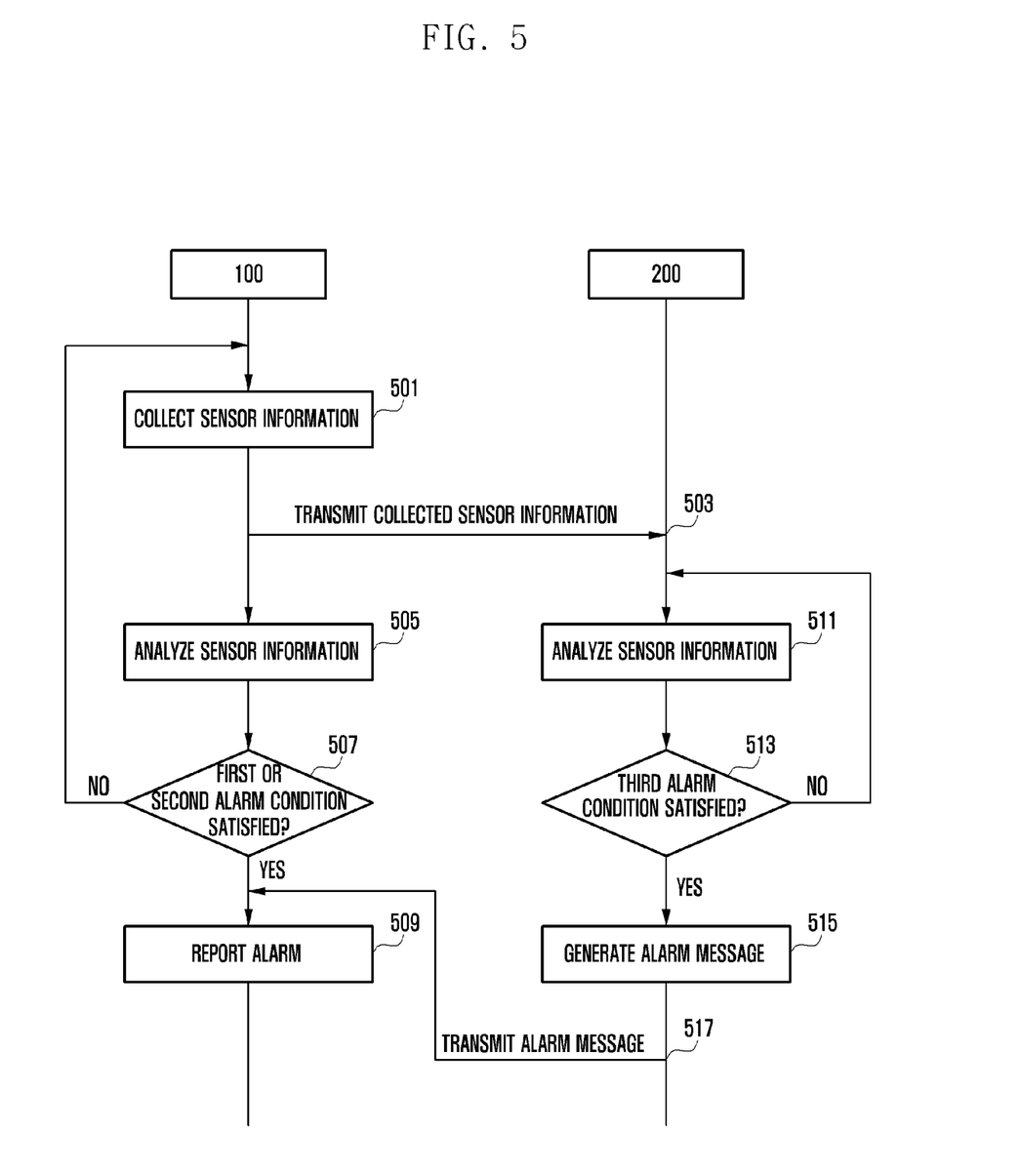
FIG. 5 is a flowchart illustrating a method of collecting sensor information and reporting an alarm in a system for managing sensor information according to an embodiment of the present disclosure.

FIG. 5 is a flowchart illustrating a method of collecting information and reporting an alarm in a system for managing sensor information according to an embodiment of the present disclosure.

Referring to FIGS. 1 to 5, the portable terminal 100 may collect sensor information at operation 501. Since the operation of collecting the sensor information has been described in FIGS. 3A and 3B, a detailed description is omitted.

The portable terminal 100 may transmit the collected sensor information to the server 200 at operation 503. The sensor information may be periodically transmitted. In this case, the server 200 may include a server of the hospital designated by the user, a server of a health management center operated by a national institute, and an individual server. In this manner, a reason that the collected sensor information is transmitted to the server 200 is because there is a limitation on the performance (e.g., information processing capability, storage space) of the portable terminal 100. For example, the storage space may be insufficient to store collected sensor information for one year or more. Due to a limited performance of the main controller 110 of the portable terminal 100, it may be difficult to analyze collected sensor information for one year or more. Next, the portable terminal 100 analyzes the sensor information at operation 505, and determines whether the analysis result of the sensor information satisfies the preset alarm condition (first or second alarm condition) at operation 507. When the analysis result of the sensor information does not satisfy the preset alarm condition (including first or second alarm condition), the portable terminal 100 may return to operation 501 and repeat the foregoing procedures. As described above, the analysis of the sensor information may be performed by the sub-controller 140 using the first alarm condition or by the main controller 110 using the second alarm condition. Conversely, when the analyzed sensor information satisfies the preset alarm condition (first or second alarm condition), the portable terminal 100 may report the alarm at operation 509. The reporting of the alarm has been described, and thus a detailed description thereof is omitted.

Meanwhile, the server 200 may analyze the sensor information received from the portable terminal 100 at operation 511, and determine whether the analysis result of the sensor information satisfies the third alarm condition at operation 513. When the analysis result of the sensor information does not satisfy the third alarm condition, the server 200 may return to operation 511 and repeat the foregoing procedures. The server 200 may analyze the sensor information periodically. Conversely, when the analysis result of the sensor information satisfies the third alarm condition, the server 200 generates an alarm message at operation 515, and transmits the generated alarm message to the portable terminal 100 at operation 517. The alarm message may include medicine information useful for user's health, emergency treatment method, recommended food, recommended exercise, and location of adjacent hospital or pharmacy.

In this manner, the techniques of the present disclosure may be variously used. For example, the techniques of the present disclosure may provide an alarm for exposure of ultraviolet rays using an UltraViolet (UV) sensor which is mounted on the portable terminal 100. In detail, the sub-controller 140 periodically drives the UV sensor to store a sensing value in the sub-memory 141. If a numeric value of the UV continuously exceeds a risk value, the sub-controller 140 wakes-up the main controller 110 to perform the alarm. The woken-up main controller 110 may output a warning message and/or a warning sound recommending to limit outdoor activity or to shield a skin because an exposed index of UV is dangerous to the user. In this case, it is preferable that the user exposes the portable terminal to the exterior so that the UV may be measured. The sensing period of the UV sensor may be set to several seconds to several minutes by the user.

Further, the techniques of the present invention may be used to provide an alarm for cold care during season changes. In detail, the portable terminal 100 may analyze the sensor information through the temperature sensor and the humidity sensor to determine whether a current environment is an environment in which the user easily catches a cold, and report the determination result to the user. That is, when there is a great difference between the highest temperature and the lowest temperature for a day, and a low temperature is maintained, the portable terminal 100 may output a warning message to recommend that the user be careful because the user is exposed to an environment in which a cold is more likely to be caught. In this manner, the portable terminal 100 may exactly and objectively collect information on a surrounding environment of the user, and provide corresponding health information.

Further, the techniques of the present disclosure may be used for a hypothermia alarm system. In detail, the portable terminal 100 may periodically (e.g., several minutes) collect and store a surrounding temperature through the temperature sensor. Next, the portable terminal 100 analyzes the sensor information periodically. When a temperature less than 0° C. maintains for 1 hour or more, the portable terminal 100 may output the warning sound reporting that the current environment is the hypothermia induction environment, or flickers a light (e.g. display unit or camera flash) to report the alarm. The portable terminal 100 may transmit an emergency call or emergency message to a preset contact point (e.g., emergency rescue party, family doctor, and a friend) to provide the alarm. In this case, the portable terminal 100 may measure a current location to transmit the location information.

Further, the techniques of the present disclosure may be used for preventing an air-conditioningitis. In detail, the portable terminal 100 may periodically measure and store a temperature through the temperature sensor. In this case, the portable terminal 100 may measure and store the temperature for every several minutes or several ten minutes through the sub-controller 140 and the temperature sensor even in a sleep state. The main controller 110 may be woken-up for every one hour or two hours to analyze temperature information collected through the sub-controller 140. When a temperature less than 20° C. is maintained for 3 hours or more, the main controller 110 may alarm air-conditioningitis care to the user, and may alarm air-conditioningitis warning when the temperature less than 20° C. is maintained for 5 hours or more. In this case, if the portable terminal 100 is connected to the air-conditioner through a wireless connection (e.g., home network system), the portable terminal 100 may automatically adjust a temperature of the air-conditioner to prevent the air-conditioningitis.

Further, the techniques of the present disclosure may be used for a patient management system. In detail, a server of the hospital may periodically receive and store sensing information from the portable terminal 100 of the patient requiring a continuous health management. In this case, the family doctor may check a health state of the patient through the stored sensing information. That is, the home doctor may continuously monitor a state of the patient. For example, when the patient is exposed to a dry environment, the home doctor may recommend the patient so that proper countermeasures for the patient are taken by transmitting a call or message to the patient. The family doctor checks an exercising of the patient measured by the motion sensor among sensing information received from the patient requiring regular training. When the exercising of the patient is insufficient (e.g., when there is too little exercising or there is too little movement), the family doctor may recommend walking through a phone call or a message.

Further, the techniques of the present disclosure may be used to measure environment information. In detail, the portable terminal 100 may collect and store the sensor information, and may periodically transmit the collected sensor information to a national institute taking charge of the health of people such as a health management center. The health management center may receive sensing information collected from portable terminals of peoples to analyze a health state of a corresponding zone. For example, the health management center may quantitatively collect an overall transition of an exercising amount of people, estimates an activity pattern of people through analysis of long accumulated information, and embody a suitable policy. The health management center separately analyzes the collected sensing information to report health risk information to a user whose health is abnormal or a user who is frequently exposed to an environment dangerous to a person's health through a phone or a message.

In addition, the techniques of the present disclosure may be used to manage a pattern of an individual life. In detail, the portable terminal 100 may collect and analyze sensing information for a long time (e.g., 1 year) to provide health information according to a life pattern of the user. For example, when the user lives, on the average, in a dry environment, the portable terminal 100 or the server 200 may report that a current environment is not suitable due to respiratory diseases to the user, and provide proper countermeasures. When the UV ray is not detected for a long time, the portable terminal 100 or the server 200 may recommend medicine information indicating that vitamin D is insufficient because of an insufficient amount of time spent outdoors and a food having a large amount of vitamin D. In this manner, the sensor information collected for a long time may be stored in the main memory of the portable terminal, and may be periodically transmitted to a designated server so that the collected sensor information may be managed.

The foregoing method for managing sensor information in the portable terminal of the present disclosure may be implemented in an executable program command form by various computer means and be recorded in a non-transitory computer readable recording medium. In this case, the non-transitory computer readable recording medium may include a program command, a data file, and a data structure individually or a combination thereof. In the meantime, the program command recorded in the non-transitory computer readable recording medium may be specially designed or configured for the present disclosure or be known to a person having ordinary skill in a computer software field to be used. The non-transitory computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as Read Only Memory (ROM), Random Access Memory (RAM), flash memory storing and executing program commands. Further, the program command includes a machine language code created by a complier and a high-level language code executable by a computer using an interpreter. The foregoing hardware device may be configured to be operated as at least one software module to perform an operation of the present disclosure.

As described above, the method and the system for managing sensor information in the portable terminal according to the embodiment of the present disclosure collect sensor information (e.g., peripheral environment information and user state information) through a low power processor. Accordingly, since the portable terminal may minimize current consumption upon collecting the sensor information, the portable terminal may continuously collect the sensor information in a sleep state. Since the sensor information may be continuously collected, the present disclosure may provide an alarm service of context awareness using the portable terminal. In addition, since the present disclosure uses the portable terminal which is always located around the user, the present disclosure may exactly collect peripheral environment information and bio information of the user, and, accordingly, may provide a health management function.

While the disclosure has been shown and described with reference to various embodiments thereof, it will be clearly understood by those skilled in the art that various changes in form and details may be made therein without departing from the spirit and scope of the disclosure as defined by the appended claims and their equivalents.

What is claimed is:

1. A method of managing sensor information in a portable terminal including at least one sub-processor driven with lower power than at least one main processor, a sub-memory, a sensor unit controlled by the at least one sub-processor, and the at least one main processor driven with higher power than the at least one sub-processor, the method comprising:
   collecting the sensor information through the sensor unit by the at least one sub-processor in a sleep state of the at least one main processor;
   checking a storage space of the sub-memory to determine whether the collected sensor information is able to be stored;
   deleting at least some sensor information from among sensor information which are previously stored in the sub-memory when the collected sensor information is not able to be stored, and storing the collected sensor information; and
   moving the sensor information stored in the sub-memory to a main memory to store therein when the at least one main processor is woken-up.

2. The method of claim 1, wherein the deleting of the at least some sensor information from among sensor information comprises deleting old sensor information based on storage order.

3. A portable terminal comprising:
   a sensor unit including at least one sensor;
   at least one sub-processor configured to control driving of the sensor unit, and to be driven with lower power than at least one main processor;
   a main memory controlled by the at least one main processor;
   a sub-memory controlled by the at least one sub-processor; and
   the at least one main processor configured to be driven with higher power than the at least one sub-processor,
   wherein the at least one sub-processor is further configured to, when the at least one main processor is in a sleep state:
      collect sensor information through the sensor unit,
      check a storage space of the sub-memory to determine whether the collected sensor information is able to be stored,
      delete at least some sensor information from among sensor information which are previously stored in the sub-memory when the collected sensor information is not able to be stored, store the collected sensor information in the sub-memory, and move the sensor information stored in the sub-memory to the main memory to store therein when the at least one main processor is woken-up.

4. The portable terminal of claim 3, wherein the at least one sub-processor is further configured to delete the at least some of the sensor information by sequentially deleting old sensor information from among the sensor information previously stored in the sub-memory.

* * * * *